United States Patent
Rodriguez

(10) Patent No.: US 10,210,386 B2
(45) Date of Patent: Feb. 19, 2019

(54) STORING IDENTIFICATION DATA AS VIRTUAL PERSONALLY IDENTIFIABLE INFORMATION

(71) Applicant: FACEBOOK, INC., Menlo Park, CA (US)

(72) Inventor: Raphael A. Rodriguez, Quincy, MA (US)

(73) Assignee: FACEBOOK, INC., Menlo Park, CA (US)

( * ) Notice: Subject to any disclaimer, the term of this patent is extended or adjusted under 35 U.S.C. 154(b) by 46 days.

(21) Appl. No.: 15/475,878

(22) Filed: Mar. 31, 2017

(65) Prior Publication Data

US 2017/0286765 A1 Oct. 5, 2017

Related U.S. Application Data

(60) Provisional application No. 62/316,044, filed on Mar. 31, 2016.

(51) Int. Cl.
*G06K 9/00* (2006.01)
*H04L 9/32* (2006.01)

(52) U.S. Cl.
CPC ..... *G06K 9/00469* (2013.01); *G06K 9/00456* (2013.01); *G06K 9/00463* (2013.01); *H04L 9/3239* (2013.01); *G06K 2209/01* (2013.01)

(58) Field of Classification Search
CPC ........... G06K 9/00469; G06K 9/00463; G06K 9/00456; G06K 2209/01; G07D 7/00; H04L 9/3239
See application file for complete search history.

(56) References Cited

U.S. PATENT DOCUMENTS

| 2003/0147548 A1* | 8/2003 | Ruhl | G06F 21/64 382/100 |
| 2009/0180698 A1* | 7/2009 | Ramani | G06K 9/2063 382/219 |
| 2011/0135160 A1* | 6/2011 | Sagan | G06K 9/00577 382/108 |
| 2017/0083731 A1* | 3/2017 | Sanwald | G06K 7/10861 |

* cited by examiner

*Primary Examiner* — Jon Chang
(74) *Attorney, Agent, or Firm* — Morgan, Lewis & Bockius LLP

(57) ABSTRACT

The present disclosure describes methods and systems for storing virtual personal identifiable information. In some implementations, the information is collected during the authentication of identification (ID) documents. The system includes a one-way hashing function that converts unique personal identifiable information into a unique digest. The system can store the digest without having to store the personal identifiable information. Because the hashing function generates the same digest when given the same input, the digests can be used as anonymized identifiers in place of the personal identifiable information.

20 Claims, 12 Drawing Sheets

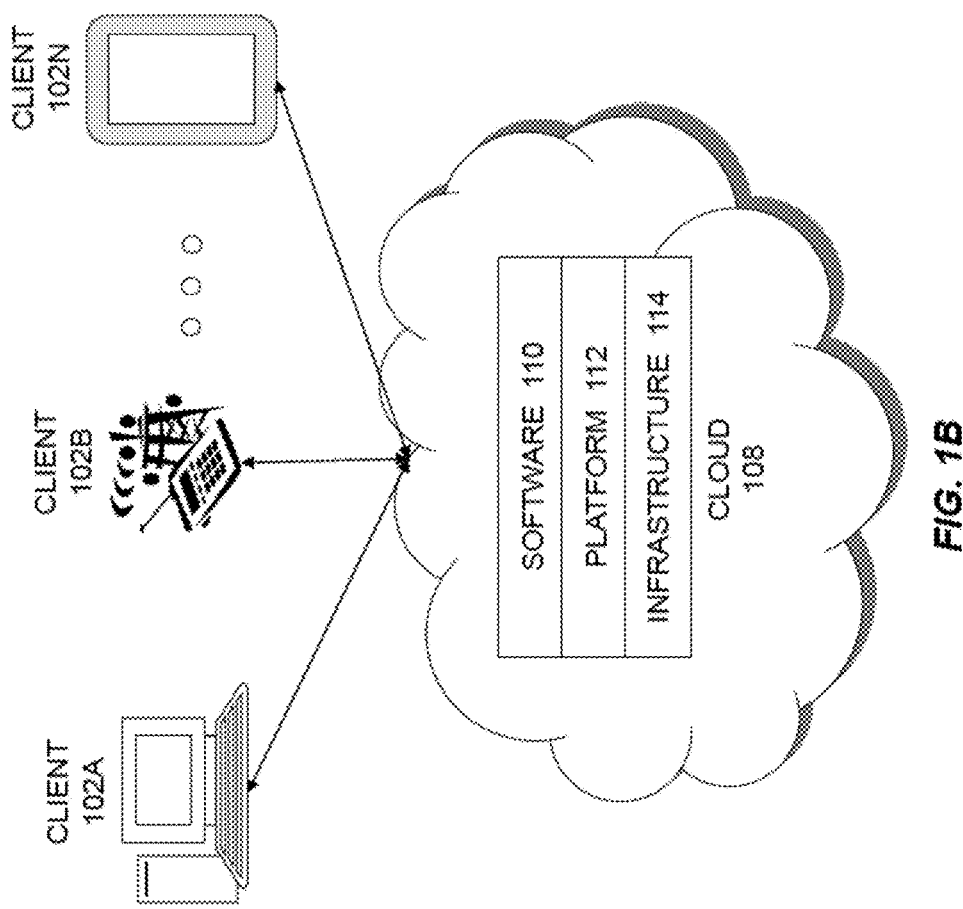

STORING IDENTIFICATION DATA AS VIRTUAL PERSONALLY IDENTIFIABLE INFORMATION

CROSS-REFERENCE TO RELATED APPLICATIONS

This application claims priority to U.S. Provisional Patent Application No. 62/316,044 filed on Mar. 31, 2016 and titled "STORING IDENTIFICATION DATA AS VIRTUAL PERSONALLY IDENTIFIABLE INFORMATION," which is herein incorporated by reference in its entirety.

BACKGROUND

Identification documents include personally identifiable information about the owner of the documents. The nature of personally identifiable information can be confidential or otherwise sensitive. In some cases, the information may be targeted by bad actors in an attempt to commit identity theft or fraud. Accordingly, privacy laws can govern the digital storage of the information.

BRIEF SUMMARY

The present solution disclosed herein is directed to methods and systems for storing virtual personal identifiable information. In some implementations, the information is collected during the authentication of identification (ID) documents. The personal identifiable information can be useful in processes such as client enrollment, mobile device management, identification processes, and transaction audits. However, the data can be a target for bad actors. The present solution includes a one-way hashing function that converts unique personal identifiable information into a unique digest. The personal identifiable information does not need to be stored by the system. Because the digest cannot be reversed to regenerate the personal identifiable information, the digest can be safely stored without worry that, if acquired by a bad actor, the bad actor would ascertain any of the original personal identifiable information. Because the hashing function generates the same digest when given the same input, the digests can be used as anonymized identifiers in place of the personal identifiable information.

According to one aspect of the disclosure, a method for securely determining a physical identification document is authentic can use personally identifiable information of the physical identification document. The method can include receiving, by an authentication manager, an image of a first physical identification document to be authenticated. The first physical identification document can include a first set of characteristics that can identify a class of the physical identification document. The first physical identification document can include a second set of characteristics that can identify a person that the physical identification document identifies. The method can include extracting the first set of characteristics and the second set of characteristics of the first physical identification document. The method can include applying a hash function on the first set of characteristics to generate a first digest and applying the hash on the second set of characteristics to generate a second digest. The method can include determining, via a digest table of previously authenticated physical identification documents using at least one of the first digest or the second digest, that the first physical identification document was previously authenticated. The method can include providing an indication that the first physical identification document is authenticated based at least on a confidence value from the digest table corresponding to the first physical identification document being greater than a predetermined threshold.

In some implementations, the method can include scanning or capturing, by an application on a client device, the image of the first physical identification document and transmitting the image to the authentication manager. The method can include performing optical character recognition on the second set of characteristics to identify personally identifiable information of the person from the first physical identification document.

In some implementations, classifying, using the first set of characteristics, the first physical identification document into a sub-class. The method can include selecting, by the authentication manager, the second set of characteristics identifying the person based on the class of the first physical identification document. The first set of characteristics can include one or more of a size of the first physical identification document, a location of a text block on the first physical identification document, or a location, an aspect ratio, or a size of a barcode on the first physical identification document. The second set of characteristics can include one or more of a name, an address, a social security number, an identification number, banking information, a date of birth, a driver's license number, an account number, financial information, transcript information, an ethnicity, arrest records, health information, medical information, email addresses, phone numbers, web addresses, IP numbers, or photographic data associate with the person.

In some implementations, the method can include classifying the second set of characteristics into one of a plurality of identifiable information types. The method can include splitting the second set of characteristics into a plurality of tiers. Each of the plurality of tiers can be associated with a different feature of the second set of characteristics. The method can include applying the hash function to each of the plurality of tiers to generate a separate digest for each of the plurality of tiers. The method can include determining, via a digest table of previously authenticated persons using the second digest, that the person was previously authenticated. The method can include providing a second indication that the person is authenticated based at least on a second confidence value from the digest table of previously authenticated persons being greater than a second predetermined threshold.

According to another aspect of the disclosure, a system for securely determining a physical identification document is authentic using personally identifiable information of the physical identification document can include a processor and a memory device. The processor can execute an authentication manager. The authentication manager can be configured to receive an image of a first physical identification document to be authenticated. The first physical identification document can include a first set of characteristics identifying a class of the physical identification document. The first physical identification document can include a second set of characteristics identifying a person that the physical identification document identifies. The authentication manager can extract the first set of characteristics and the second set of characteristics of the first physical identification document. The authentication manager can apply a hash function on the first set of characteristics to generate a first digest and on the second set of characteristics to generate a second digest. The authentication manager can determine, via a digest table of previously authenticated physical identification documents using at least one of the first digest or the second digest, that the first physical identification document was previously authenticated. The authentication manager can provide an indication that the first physical identification document is authenticated based at least on a confidence value from the digest table corresponding to the first physical identification document being greater than a predetermined threshold.

In some implementations, the authentication manager can be configured to receive the image of the first physical identification document from a client device. The image can be scanned or captured by an application executed on the client device. The authentication manager can be configured to perform optical character recognition on the second set of characteristics to identify personally identifiable information of the person from the first physical identification document. The authentication manager can be configured to classify, using the first set of characteristics, the first physical identification document into a sub-class. The authentication manager can be configured to select the second set of characteristics identifying the person based on the class of the first physical identification document.

In some implementations, the first set of characteristics can be one or more of a size of the first physical identification document, a location of a text block on the first physical identification document, or a location, an aspect ratio, or a size of a barcode on the first physical identification document. The second set of characteristics can be one or more of a name, an address, a social security number, an identification number, banking information, a date of birth, a driver's license number, an account number, financial information, transcript information, an ethnicity, arrest records, health information, medical information, email addresses, phone numbers, web addresses, IP numbers, or photographic data associate with the person.

The authentication manager can be configured to classify the second set of characteristics into one of a plurality of identifiable information types. The authentication manager can be configured to split the second set of characteristics into a plurality of tiers, each of the plurality of tiers associated with a different feature of the second set of characteristics. The authentication manager can be configured to apply the hash function to each of the plurality of tiers to generate a separate digest for each of the plurality of tiers. The authentication manager can be configured to determine, via a digest table of previously authenticated persons using the second digest, that the person was previously authenticated. The authentication manager can be configured to provide a second indication that the person is authenticated based at least on a second confidence value from the digest table of previously authenticated persons being greater than a second predetermined threshold.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIGS. 1B-1D are block diagrams depicting embodiments of computers useful in connection with the methods and systems described herein;

Figure 1A:
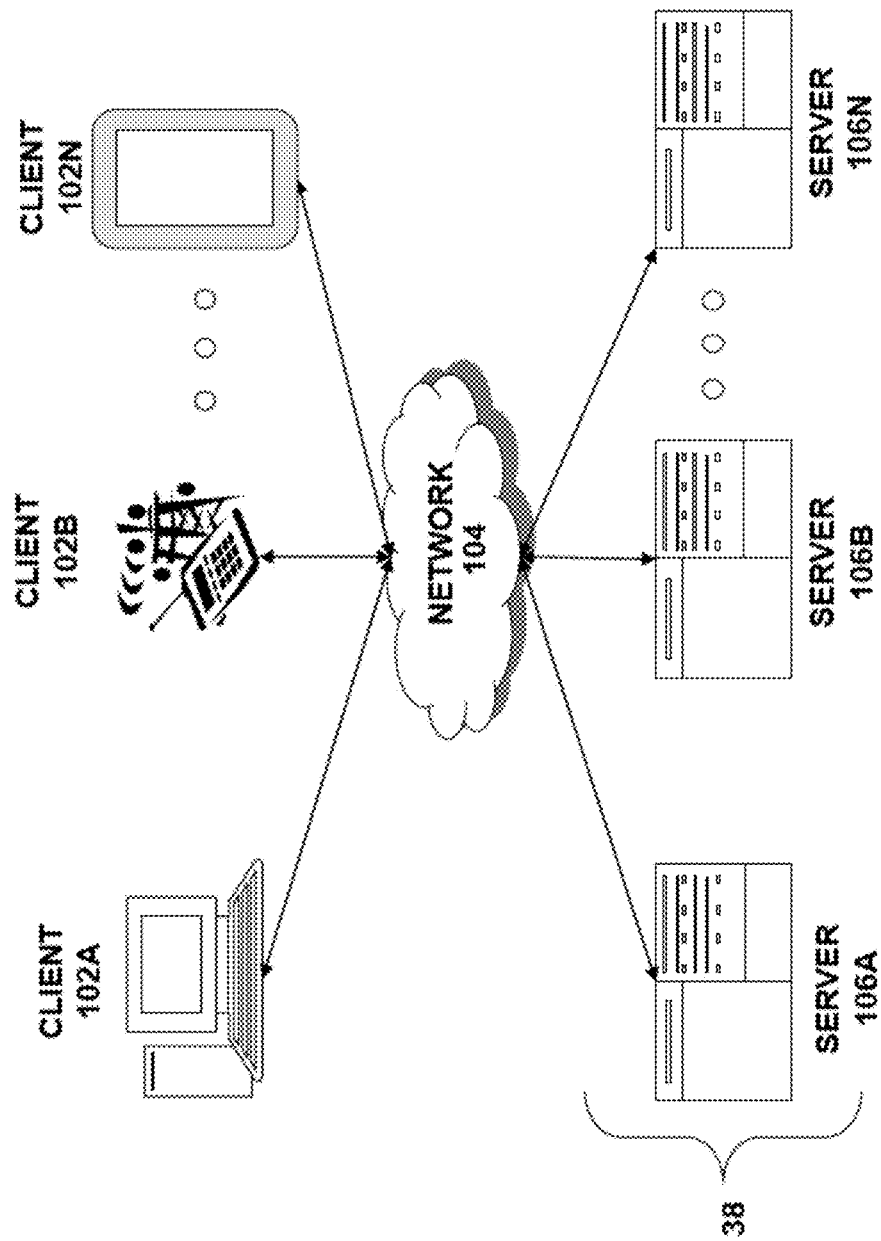
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following enumeration of the sections of the specification and their respective contents may be helpful:

Section A describes a network and computing environment which may be useful for practicing embodiments described herein.

Section B describes embodiments of a system and method for the authentication of physical features on identification documents.

Section C describes embodiments of a system and method for storing personally identifiable information.

A. Network and Computing Environment

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; a Flash object, software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS 7, 8, or 10 manufactured by Microsoft Corp. of Redmond, Wash., UNIX, LINUX, or OS X.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL or IPSec VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; LTE; or any other protocol able to transmit data among mobile devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and an authentication manager 202. The I/O controller 123, in some embodiments, is further connected to a keyboard 126, and a pointing device 127. Other embodiments may include an I/O controller 123 connected to more than one input/output device 130A-130N.

Figure 1C:
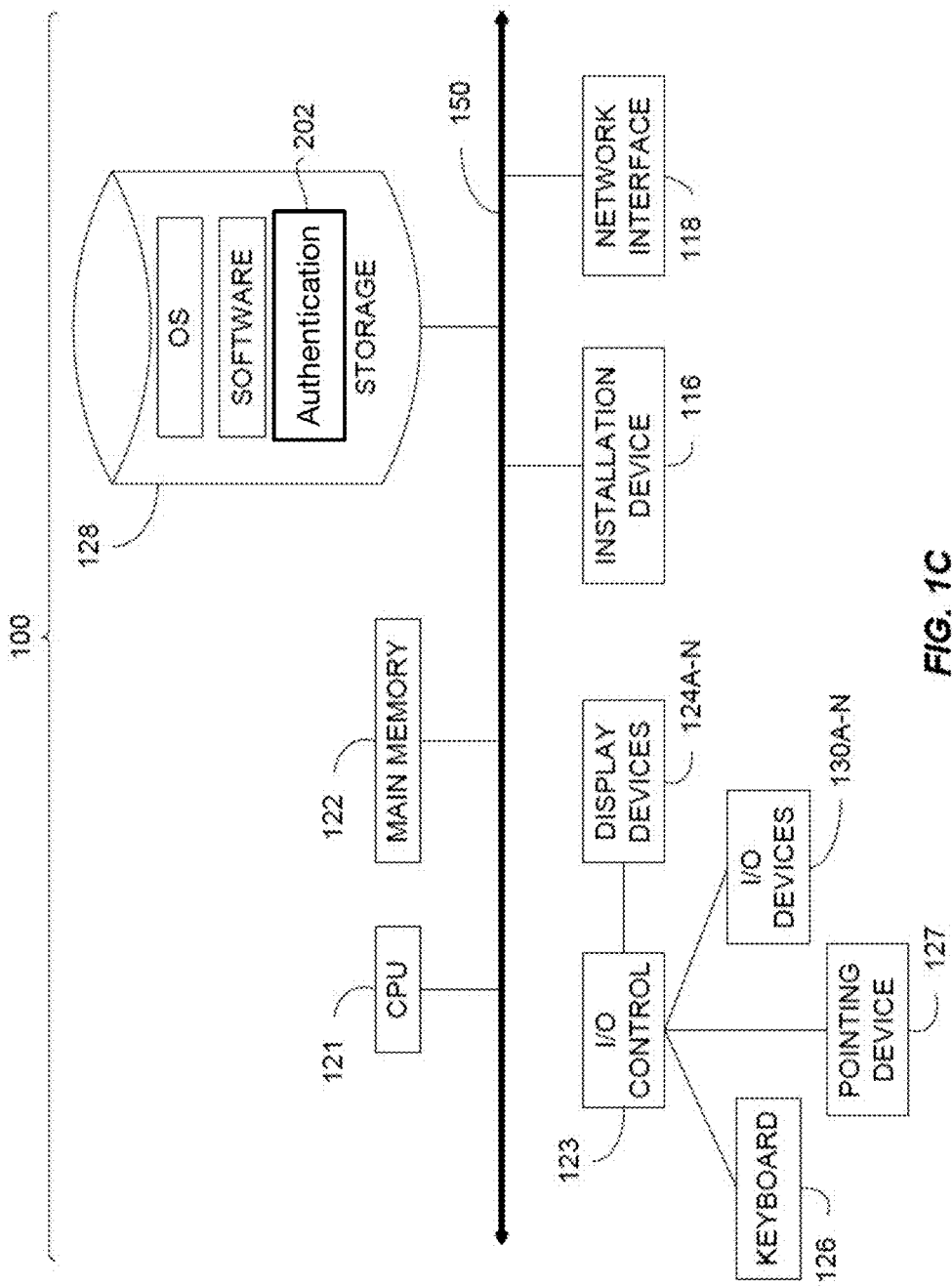
Figure 1D:
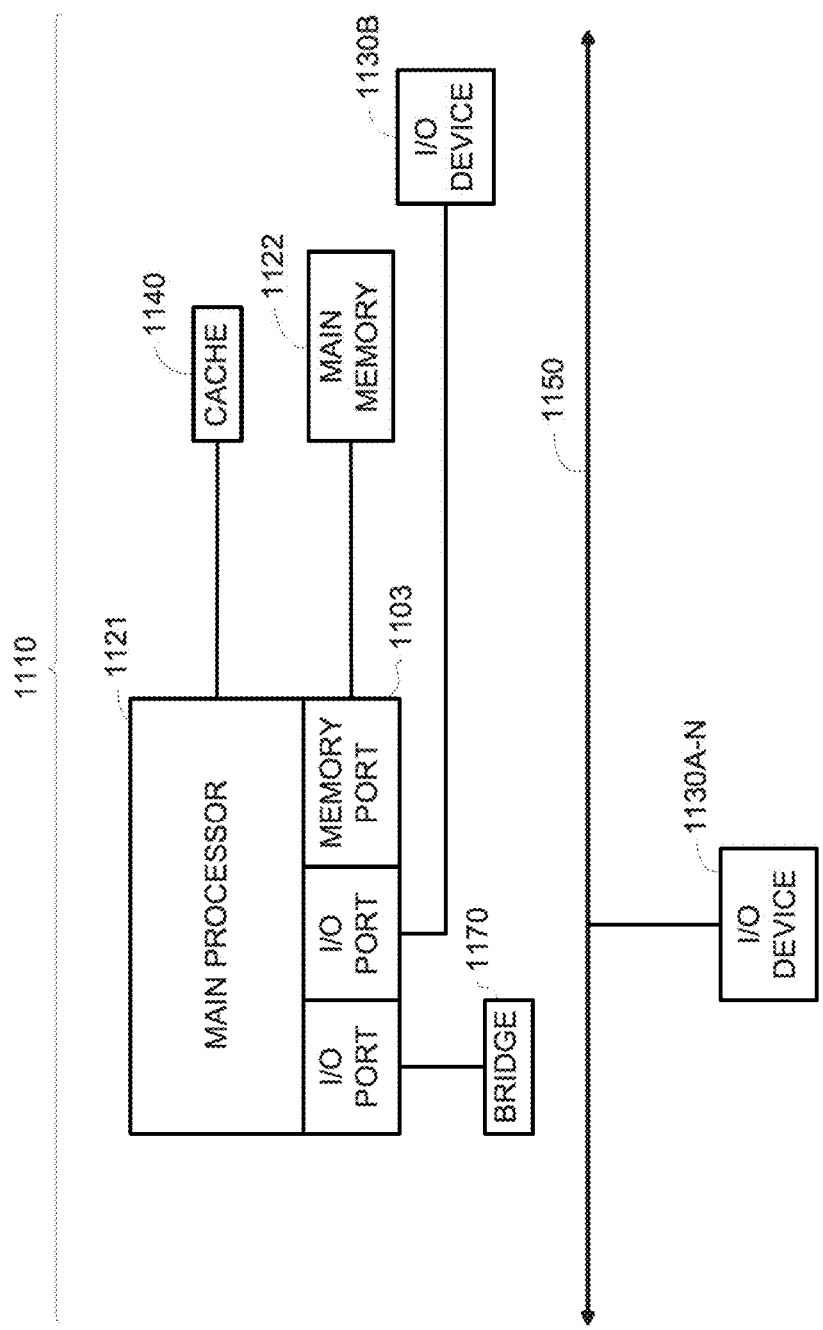

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include identification (ID) authentication software 120. The computing device 100 may further include a storage device 128 that can be either one or more hard disk drives, or one or more redundant arrays of independent disks; where the storage device is configured to store an operating system, software, programs applications, or at least a portion of the identification (ID) authentication software 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, IEEE 802.x, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; a Windows Phone manufactured by Microsoft Corporation, an Android phone; or any other handheld mobile device. Having described certain system components and features that may be suitable for use in the present systems and methods, further aspects are addressed below.

B. System and Method for Authentication of Physical Features on Identification Documents Referring to FIGS. 2-8E, the systems and methods of the architecture, process and implementation of ID document authentication will be described. In general, the present disclosure discusses a solution for automatically authenticating ID documents, such as driver's license and other government (and non-government) supplied IDs. A client device of the system can be configured to operate on smartphones, tablets, and other mobile devices. The client device can capture an image of a candidate ID and upload the image to an authentication server of the system. The server can process the image to extract physical characteristics of the ID document. In some implementations, the server extracts physical characteristics of one or more objects or patterns on a face of the ID document, such as a barcode. The server can analyze the extracted physical characteristics and compare the extract characteristics against a database of characteristics extracted from known valid ID documents. Based on the comparison, the server can make a determination of whether the ID document is fake and return the result to the client device.

Figure 2:
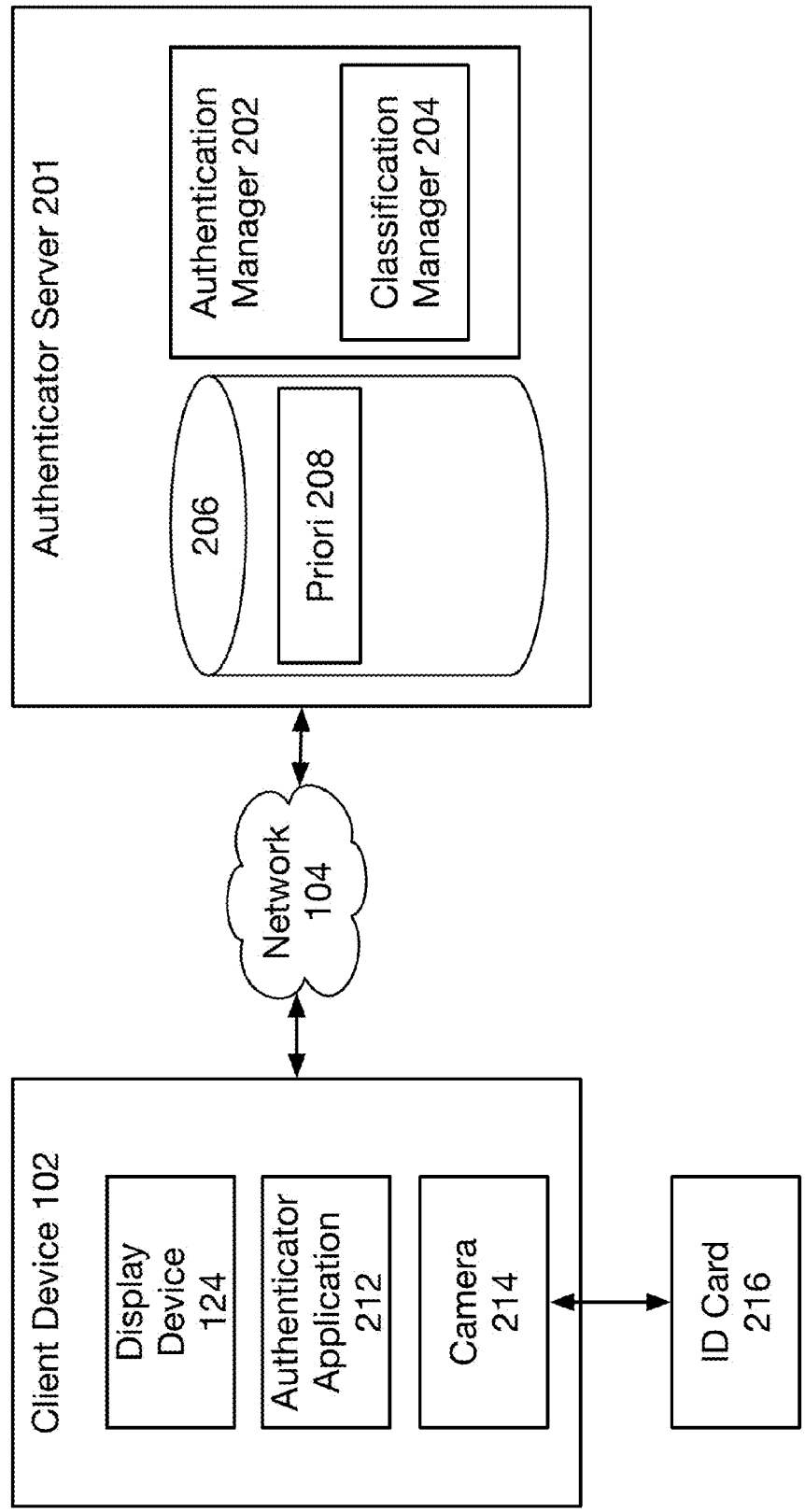
FIG. 2 illustrates a block diagram of a system for authenticating identification (ID) documents in accordance with an implementation of the present disclosure.

FIG. 2 illustrates a block diagram of a system 200 for authenticating identification documents. The system 200 can include a client device 102 that is in communication with an authentication server 201 via a network 104. The authentication server 201 executes at least one instance of an authentication manager 202. The authentication manager 202 includes a classification manager 204. The authenticator server 201 also includes a database 206 that stores a data structure of priori knowledge sets 208 that are used to analyze IDs 216.

The system 200 can also include one or more client devices 102. Each client device 102 executes an instance of the authenticator application 212. Each client device 102 may include a camera 214 for scanning or otherwise reading an ID document 216 (also referred herein as ID cards), and a display device 124 for presenting or displaying a copy of the scanned ID card and authentication results. In some implementations, the authenticator application 212 can perform part or all of the authentication analysis described herein. In other implementations, the authenticator application 212 can transmit a copy of the scanned ID to the authenticator server 201, which can analyze the image and can return a result to the client device 102 and authenticator application 212.

Each and/or any of the components of the authenticator server 201 and authenticator application 212 may include or be implemented as one or more applications, programs, libraries, scripts, services, processes, tasks and/or any type and form of executable instructions executing on one or more devices or processors.

The client device 102 is configured to captured an image of the ID card in some electronic manner. For example, if the client device 102 is a smartphone with a built in camera, the authenticator application 212 can use the smartphone's camera to capture an image of the ID card. In other implementations, the client device 102 can couple to another device such as a stand alone still or video camera or scanning device to capture images of the ID card. The original image of the ID card captured may be larger than the ID card 216 (e.g., include unnecessary background portions) and the ID card may be extracted from the original image. For example, the background or other parts of the image that are not part of the ID card may be automatically or manually removed. This process may involve some image processing such as rotation, deskewing, cropping, resizing, and image and lighting correction to obtain a proper orthogonal image with the proper aspect ratio for the document type in question.

In some implementations, the authentication manger 202 is configured to conduct a training phase where physical features of known real IDs are determined by a measurement process. For example, physical characteristics relevant for 2D barcodes can include location, size, and aspect ratio of barcode and barcode elements, number of groups, rows, columns, specific state security features, encryption markers, or any combination thereof are captured and analyzed from known real IDs. These features are stored for further use in an authentication phase as priori knowledge sets 208 in the database 206. In some implementations, the priori knowledge sets 208 are updated as the system 200 scans and analyzes additional ID cards 216.

As further described below, the client device 102 and the authenticator server 201 can then be used to authenticate ID cards 216. As an overview, a candidate ID 216 card is captured as an image via the camera 214 and transmitted to the authenticator server 201, which can determine a degree of confidence that the ID card 216 is real. The authenticator server 201 can derive a set of features based on physical characteristics that can include characteristics of a 2D barcode on the ID card 216. The image is classified as to type by the classifier manager 204 and its specific type is determined. For authentication, the features (e.g. those from the 2D barcode) are compared to features for reals IDs (obtained in the training phase) for that specific ID type. Differences between the candidate and real feature sets are computed, and the difference is used to calculate a confidence level that the ID is genuine. A threshold can be used with this confidence level to determine if the ID will pass or fail.

The use of fake IDs is a large issue in many business sectors such as underage drinking prevention, visitor management, ID retail fraud, employment authorization, etc. The fake IDs utilized today are obtainable over the internet for low cost and are remarkably close in appearance to the genuine article—even to the point that law enforcement personnel have difficulty distinguishing the real from the fake.

Compounding the problem is the huge variety of government IDs that are issued. For instance, each state has a distinctive design and information layout. Commonly there are multiple design varieties from the same issuer in circulation simultaneously. In addition, within a particular ID issue, there are multiple types such as driver's licenses, identification cards, learner permits, commercial licenses, and usually vertical format license for those under 21 years of age (in the US). Each type of license may incorporate different and varied types of security features.

Thus, anyone inspecting an ID has a difficult task—even if they have received specialized training. Often, the ID checker is under pressure to process the ID quickly. If done manually, they may utilize magnifiers or special lighting (e.g. UV) to do a better job at examining some of the security features embedded in the IDs. But careful human inspection of IDs can be slow and subject to error. To assist in the process, over the years, specialized equipment has been developed to help automate the inspection process. The technology described herein can find use in such automated authentication systems to help identify false documents.

Organizations such as the American Association of Motor Vehicle Administrators (AAMVA) have issued standards for ID layout, information formats, and suggested security features. In the US, the REAL-ID Act has helped to push ID issuers in the US to produce licenses produced under more secure conditions and with more security features. However, fake ID producers have also gotten much more sophisticated in duplicating the security features on real IDs including holograms, ultraviolet features, ghost images, microprint, laser perforation, raised printing, variable font-size printing, kinegrams, and barcodes.

Barcode scanners use a number of technologies from using a scanning laser to capture of the image and reading with software. But the basic idea is to convert the barcode into a text string. For certain applications such as license reading, the task is then to parse out this string into fields such as name, address, and other relevant information about the person located on the front of the ID that is readable to the naked eye alongside their photo.

In the early days of fake ID's it was difficult to generate a PDF-417 barcode with the correct info. Comparing the barcode info to the front of the ID info was often an effective technique for fake detection. For driver's licenses in the US and Canada, there is an AAMVA standard that makes recommendations on the layout, header information, fields, delimiters, etc. and specifies the precise format of the barcode information. Even with standardization, different issuers include different information and in different order. The standard is a two edged sword—making available the format to those who wish to duplicate it. Barcode generators are now readily available even online to generate a credible looking 2D barcode that is scan-able with most barcode readers. Such a barcode will decode into a legal text string and likely into acceptable parsed data fields.

The current generations of fake IDs have credible printing and color matching, holograms, UV features, and barcodes that scan similar to real IDs. Fake ID producers even advertise their product as being able to "pass barcode scanning." The ability to be scanned successfully is no longer sufficient to detect fake IDs. This has spawned an era of newer "reader-authenticators" which are based on high resolution imaging of both the front and back of the ID. In this case, the barcode could be decoded from the image rather than from the traditional technique of laser scanning.

Figure 3:
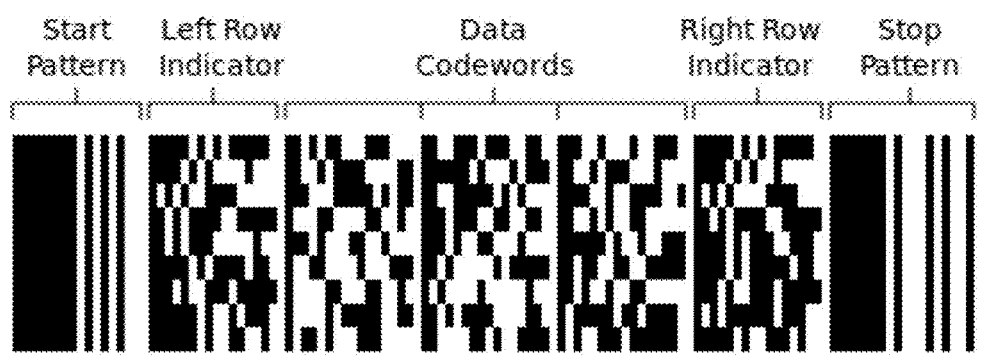
FIG. 3 illustrates an example PDF-417 2D barcode in accordance with an implementation of the present disclosure.

In some implementations, the ID card 216 can include a barcode, such as a PDF-417 barcode. The PDF-417 2D barcode format has been adopted as the standard format for machine readable data in US and Canada driver's licenses and indeed for most of the ID-1 sized cards in the world. This format has the advantages of being able to contain a lot of data, has redundancy in case part of the code is damaged or dirty, and can be read with a variety of devices including laser and image based scanners. FIG. 3 illustrates an example PDF-417 2D barcode 300.

The PDF-417 is a 2D stacked barcode symbology and has become the default standard for encoding information on US driver's licenses. The barcode can include of linear rows of stacked code words. The nomenclature PDF-417 (Portable Data File 417) comes from the fact that each code word consists 4 black bars and 4 white spaces of varying lengths within a horizontal grid of 17 positions. There can be from 3 to 90 rows, and each row can be considered a kind of linear 1D barcode. Within a row, there can be from 1 to 30 code words. No two successive rows are the same except for within the start and stop patterns.

Figure 4A:
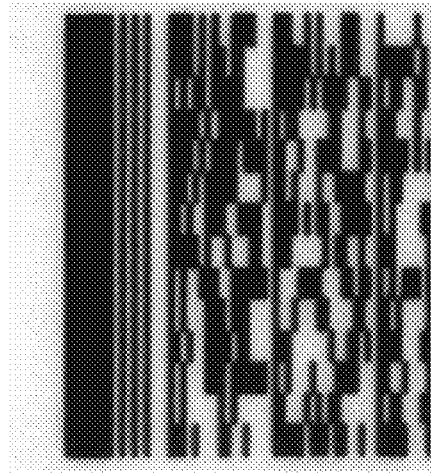
FIGS. 4A and 4B illustrate the different height to width ratios used by different states when generating a barcode in accordance with an implementation of the present disclosure.
Figure 4B:
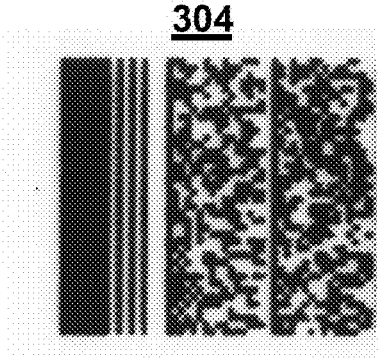
Figure 5:
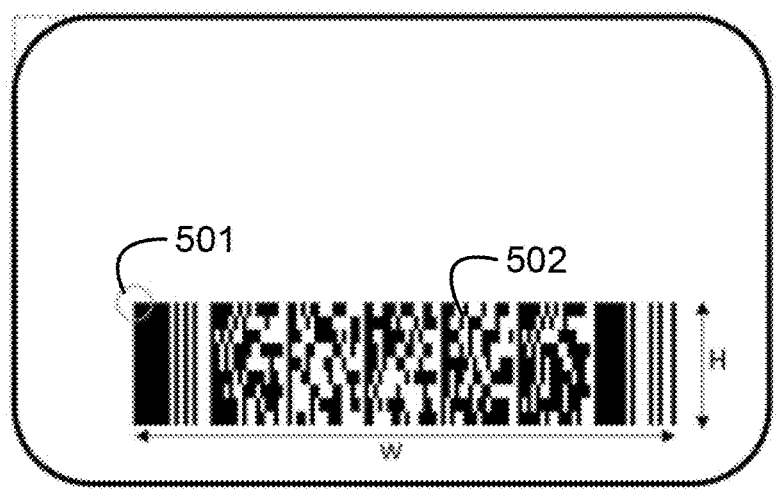
FIG. 5 illustrates the placement of an example barcode on an ID document in accordance with an implementation of the present disclosure.
Figure 6:
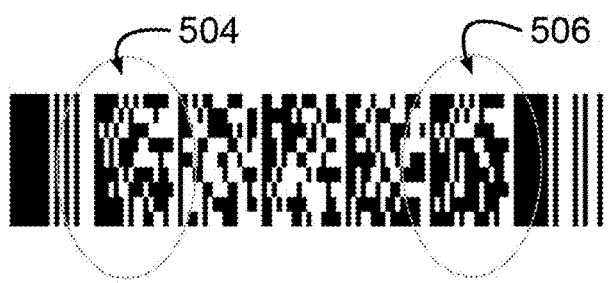
FIG. 6 illustrates an example barcode in accordance with an implementation of the present disclosure.

The minimal element in a code word is a module, which is the grid element in a row within the 17 columns of the code word. There is a recommendation that the module's height be 3 times its width. However, different barcode issuers utilize different height to width ratios in their barcodes and this sometimes results in perceptually different looking barcodes. See the two examples below which have very different overall and element sizes. For example, FIGS. 4A and 4B illustrate the different height to width ratios used by different states. FIG. 4A illustrates a portion 302 of a PDF-417 barcode from a South Carolina driver's license and FIG. 4B illustrates a portion 304 of a PDF-417 barcode from a Mississippi driver's license.

While, in some situations, the size of a black module would be the same size as a white module, this does not always hold true. In some cases, the quality of the printing is an important factor affected by the type of printer, printer supplies, temperature of the print head, etc. This variability can lead to black ink bleed or shrinkage and lead to wider black space elements and thus narrower white space elements and vice versa. Most barcode readers try to deal with this element of variability.

In some implementations, the first element in a given code word is always black (the beginning element of the first of four bars in the code word) and the last element in a code word is always white (the end element of the last of four spaces in the code word). This property makes the divisions between code words fairly visible to the eye. The sets for code words stacked vertically may be referred to as a group. The number of groups varies with how the barcode is generated but can be somewhat controlled via the input parameters to the barcode generator.

In some examples, the PDF-417 barcode always begins with a fixed start pattern and ends with a fixed, but different, stop pattern. The start pattern might be considered a fixed group since it is generally the same width as the code word groups and consists of 4 bars and 4 spaces just like the other code words. The start pattern is the same in all rows. The stop pattern is similar to the start pattern but has one extra minimal width bar at the end. The start and stop patterns allow the reader to determine the orientation of the barcode easily.

The left row indicator group may not contain the actual text encoded in the barcode but rather other parameters such as the number of rows and columns, etc. in the barcode. The right row indicator may also not contain the actual text.

The number of code words on a line can be set at generation time. There are also different compaction modes, and different correction levels. Depending on the number of code words across (groups), the type of compaction, and the correction levels chosen, the actual 2D printed barcode can look quite different even though the actual encoded string is identical.

The actual physical position of the barcode on an ID card is one example of a physical characteristic and is substantially consistent within the same issuer (e.g., a state's division of motor vehicles). In US IDs, the barcode is printed on the back of the ID. AAMVA standards have recommendations for barcode placement and size, but there is considerable variability among issuers. The back of IDs is generally less colorful than the front and thus less potential interference with the variable material printed in black ink there such as a 2D barcode. Blank cards may already have a design printed on them, and the variable information is printed in a separate pass. Some issuers may print the variable information on an overlay or cover the printed information with an overlay.

The barcode height and width are also generally fixed within a given issuer. Some issuers, during the same general issued series (on the front of the ID), have decided to include more information in the barcode on the back and thus there may be multiple sizes of barcodes issued within the same series. One example of this is the Massachusetts 2010 series where IDs issued past a certain date were of a larger size.

While forgers have easy access to 2D barcode generators for the PDF-417 symbology, unless they choose the exact same parameters in all these dimensions as used in the real document, the barcode will vary somewhat physically in appearance from a genuine document.

While the examples provided herein detect false IDs based on the physical characteristics of barcodes, such as the PDF-417 barcode standard, any other type of barcode may be used (e.g. Code 39, Code 128, and others), as well as other fixed and variable type patterns found on the front or back of IDs. The difference between conventional authentication techniques, which use methods such as pattern matching to verify the presence of a feature, and this concept is the focus on the relationships between physical elements resulting from the ID issuers unique production process.

In some implementations, the authentication manager 202 can measure certain characteristics of an ID or section of the ID and perform a comparison of those characteristics with characteristics from a genuine ID. The authentication manager 202 can select appropriate and measurable characteristics that are capable of distinguishing real from fake IDs. The strength of the characteristics can vary quite a bit and can depend on how easy or difficult it is for the false document supplier to recognize specific properties and then to recreate the characteristics of the genuine document. It may be easy to create a false document that has the general look and feel of a real document but a suitably designed automatic detection schema can be designed to pick up much more subtle differences that could pass mere human inspection.

In some implementations, the authentication manager 202 can include a classification manager that can determine the class of ID card presented to the system 200. For example, as each US state issues different ID cards, the classification can indicate from which state the ID card was issued. After classifying the ID card's state, the ID card may be sub-classified. For example, states may issue driver's licenses, ID cards, learner's permits, etc.—each of which could be a different sub-class under the state's classification. In some implementations, the ID card can be classified into one or more of 410 different document classes in the US in an ID1 format. Classifying the ID card can help the authentication manager 202 select those characteristics that provide the best information for determining the validity of the ID card. The physical characteristics of barcodes (e.g., overall size, location, element size, rows and columns, etc.) vary between different issuers (and thus different classification). These characteristics can be used as features to determine or narrow down the ID type by matching these features against the standard features across all classes to determine a best match or small set of potential matches. By classifying an unknown document to a particular class, it provides a great advantage since the authentication manager can look up the correct features to expect for that particular document. If the document features (e.g. barcode characteristics) are not close enough to the real document, then the authentication manager can determine or judge the document to be not sufficiently close to be accepted as a real document or possibly an altered document.

The authentication manager 202 can also measure certain physical characteristics of the barcode on the ID card and treat the characteristics as features. The features can be compared to the corresponding feature characteristics of genuine (e.g., known valid) documents and known fake documents to make a determination as to whether the unknown document's features are closer to the real or the fake set of features.

The authentication manager 202 can analyze one or more characteristics of the ID card to determine the validity of the ID card. False documents typically will have characteristics that will not match real documents in one or more of the following features. The features can include the physical location and size of the barcode on the ID. This feature can use an ID document's conformance to established size standards (ID1, ID2, . . . ) to help make a determination as to the document's validity. Given this knowledge, the DPI value can be determined from the image and used as a ruler to locate, measure distance, scale, and size. 2D barcodes will generally be of fixed width and height. It is possible however for an issuer to modify the size within a particular issue—if they decide to add more information fields. For example, Massachusetts has two different barcode heights within the same issue. Fake barcodes will often not be the correct size or in the exact correct location.

To derive these features, the physical location and/or size of the barcode may be measured in pixel units. For example, and referring to FIG. 5, the X,Y location 501 relative to the edge or corner of the document or relative to some other fixed anchor point can be found, and then the size (height and width) of the barcode 502 can be measured. Given the (dots per inch) DPI of the image, these measurements can be converted into physical units such as inches or millimeters. Comparisons, made in physical units, result in resolution independence.

Another characteristic can be the height to width ratio of the barcode. The measure of the ratio of the height to width of the barcode can be referred to as the aspect ratio of the barcode. This feature can be size invariant but can depend on having an image capture process that will generate an image with the correct overall aspect ratio for the document.

Another characteristic can be the number of code groups horizontally in a barcode. This is related to the number of columns for the 2D barcodes. A related characteristic can be the number of columns horizontally in a barcode. Generally, this can be related to the number of code words since there are a fixed number of module elements within a horizontal code group for PDF-417 barcodes. Each code group can include of 17 elements.

Another characteristic can be the number of rows in a barcode. This is a characteristic that is often gotten wrong by forgers. By creating a table of rows and columns for known ID types, this can be used for comparison for candidate IDs.

Another characteristic can be the module element size. The module element is the smallest barcode element and can be either a white or black module. White and black modules can have different measured sizes due to printer variations and dye/ink characteristics.

Another characteristic can be the ratio of black and white module element sizes. A valid barcode does not necessarily have the same size black and white module sizes due to printer variations and dye/ink transfer characteristics.

In some implementations, the smallest elements in a 2D barcode can have a fixed aspect ratio and size. As stated, the size of the smallest black elements and white elements may also vary from each other due to the type of printer, printer element temperature or other factors, and the relative size may also be a distinguishing characteristic, if stable for that type of ID. The height to width ratio of the smallest module element size is supposed to be on the order of 3 to 1. However, this ratio varies substantially for different IDs. As seen in the earlier example, the ratio varies from approximately 5-1 for South Carolina to 1-1 for Mississippi. Hence, it becomes a distinguishing property for that Issuer.

Additional data encoded in the barcode can also be used as characteristics for analyzing the validity of the ID card. The barcode can include data that is not related to the owner of the ID card. This data can include an encryption level, size of the barcode, number of rows and columns, and row and column information, and other characteristics.

In some implementations, the authentication manager 202 can use template matching to make physical measurements of the many characteristics described above. For instance, a template match of the upper left corner and lower right corner of a barcode can be used to determine the size of the barcode. Either corner could be used to define the location.

A count of average gray value for each horizontal position and subsequent peak detection can be used to determine the number of groups horizontally. Histogram analysis can be used to measure rows and modules.

Pattern matching can also be used by the authentication manager 202 to determine if patterns in the barcode match expected codes. For example, and also referring to FIG. 6, because the left most PDF-417 group 504 can contain some of the basic encoding features (e.g. row and column information), and not the actual data, the pattern for this group is constant across IDs of a given classification. A pattern match done on just this first group could detect fake IDs that do not encode the barcode correctly. Likewise, and also referring to FIG. 6, the Right Row Indicator 506 can normally remain constant within a particular document class and pattern matching on this element could be used as a feature.

Filler data in the barcode can also be used by the authenticator manager 202 as a characteristic. In some 2D barcodes, there are areas with repeating code words that are used as filler data. This comes about due to the variable amount of data encoded into a given barcode combined with the need to maintain a fixed physical size of barcode as well as number of rows and columns. A pattern match on the filler code word patterns to see if they match those found on real IDs could be used as a feature.

In some implementations, the decoding process can be used as a characteristic. The decoder can know predetermined information about the barcode to enable the decoder to decode the barcode. If the barcode reader detects deviation from the expected values, those deviations can be used as characteristics.

Figure 7:
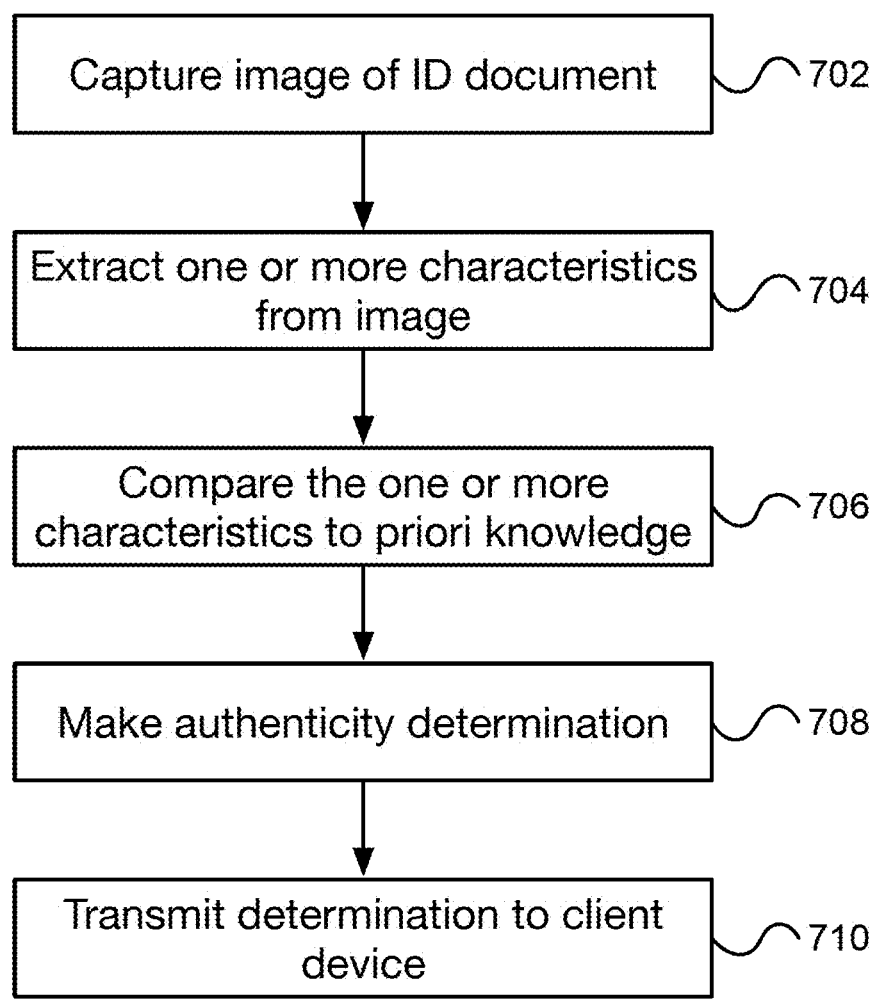
FIG. 7 illustrates a block diagram of a method for authenticating an ID document in accordance with an implementation of the present disclosure.

FIG. 7 illustrates a block diagram 700 of a method for authenticating an ID document. The method can include capturing an imaging of an ID document (BLOCK 702). The method can include extracting one or more characteristics from the image of the ID document (BLOCK 704). The one or more characteristics can then be compared against priori knowledge (BLOCK 706), and an authenticity determination can be made (BLOCK 708). The authenticity determination can be transmitted to a client device for display (BLOCK 710).

Figure 8A:
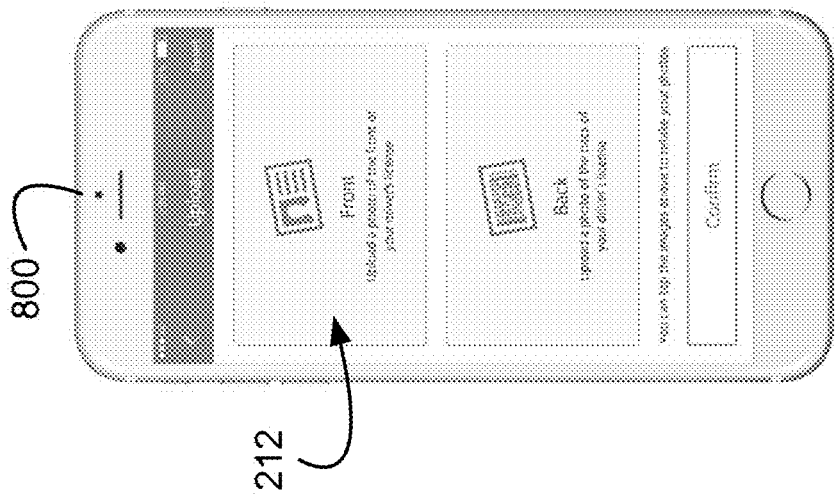
FIGS. 8A-8E illustrate screen shots of an instance of the authenticator application determining the authenticity of a ID document in accordance with an implementation of the present disclosure.
Figure 8B:
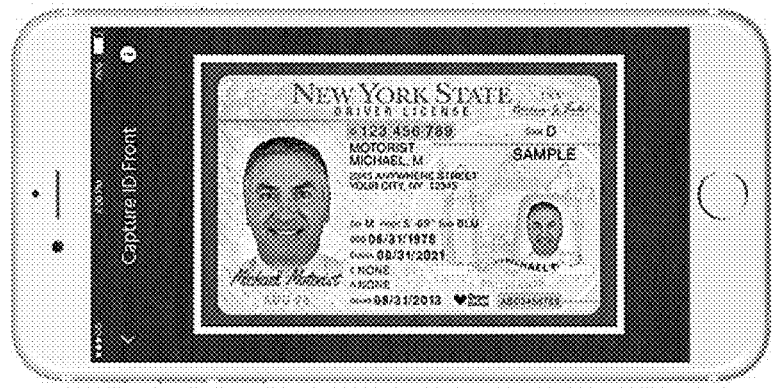
Figure 8C:

As set forth above, the method can include capturing an image of an ID document (BLOCK 702). The image of the ID document can be captured by a client device. For example, the authenticator application discussed above can be executed by a smartphone or tablet computer. The authenticator application can use the smartphone's built in camera to capture an image of the ID document. For example, and also referring to FIGS. 8A-8C, a smartphone 800 can execute an instance of the authenticator application 212, which can present the user with a prompt to capture an image of the front and back of an ID document. FIG. 8B illustrates the user capturing the front of the ID document and FIG. 8C illustrate the user capturing the back of the ID document. As illustrated in FIGS. 8B and 8C, and described above, the authenticator application 212 can remove the background and other portions of the images from the captured image to leave substantially only the ID document in the captured image. The authenticator application 212 can also rotate, deskew, and otherwise correct the captured image to prepare the image for processing.

The method can also include extracting one or more characteristics from the captured image (BLOCK 704). In some implementations, the characteristics are extracted by the authenticator application 212 executing on the client device. In other implementations, the client device can transmit the image to a remote server, e.g., the authenticator server, where the characteristics are extracted by an authentication manager. The extracted characteristics can be any of the characteristics described herein. In some implementations, the authentication manager can classify the captured ID document and determine to which class and sub-class the ID belongs. Based on the classification, the authentication manager may select predetermined characteristics from the captured image. For example, after classifying the ID document as a driver's license from Ohio, the authentication manager may reference a lookup table to determine which characteristics are most beneficial to use in determining the validity of an Ohio driver's license and then extract those characteristics form the image.

The method can compare the extracted characteristics to priori knowledge (BLOCK 706). The authentication manager can include a machine learning algorithm that is configured to determine whether the extracted characteristics match those extracted from known valid ID documents. The method can include making an authenticity determination (BLOCK 708) based on the comparison. In some implementations, the determination is binary and returns a VALID or INVALID determination. In other implementations, the authenticity determination may be a range indicating the likelihood the ID document is valid. The range can range from 0% (e.g., not valid) to 100% (valid). The range may be include a threshold (e.g., 75%) over which the document is determined valid or likely valid.

Figure 8E:
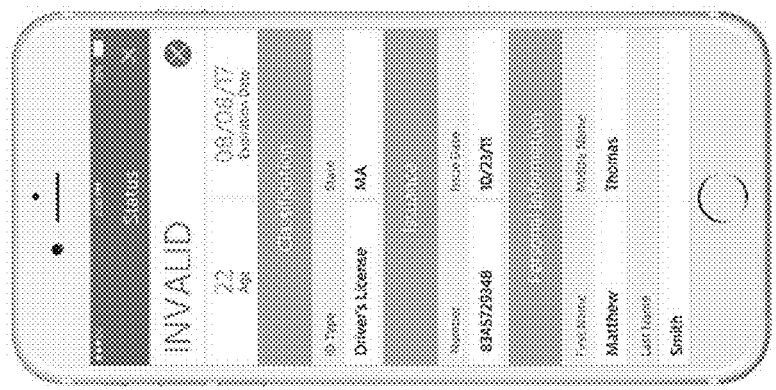
Figure 8D:
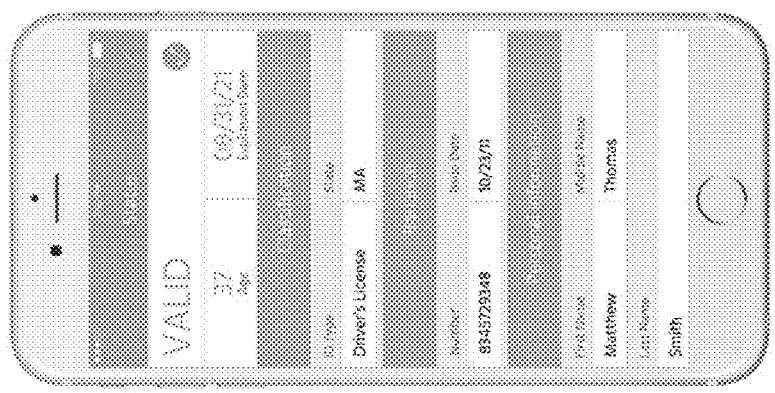

The method can also include transmitting the determination to the client device (BLOCK 710). FIGS. 8D and 8E illustrate example results of the determination being transmitted back to the client device. FIG. 8D illustrates the authenticator application displaying a valid determination after determining a presented ID document is valid. As illustrated, the authenticator application can also display additional information, such as the classification and personal information either determined by the authenticator server or extracted from the barcode on the ID card. FIG. 8E illustrates an example of the authenticator application displaying an invalid determination.

C. System and Method for Storing Personally Identifiable Information

The present section of the disclosure discusses systems and methods for securely storing personally identifiable information (PII). The PII can include the owner or user information contained on government and non-government identification documents, such as driver's licenses and pass-ports. The PII can include the name, date of birth, and other information stored on or in the ID document that is used to identify the owner of the ID document. When stored, PII and other sensitive user information can be subject to privacy and information security laws and may be the focus of security attacks by bad actors.

As an overview, the present disclosure stores the PII as a digest. The digest is generated by processing the PII with a hashing function to generate an encrypted hashed key. For any unique PII input into the hashing function, the process generates a unique digest of a predetermined length. Because the hashing function is a one-way function, the digest can be stored without the risk that the digest can be reversed to regenerate the PII. The digest can be stored and used in transaction logs to identify ID documents and owners that were previously authenticated. Storing the digests also increases the efficiency of the system. Authenticating an ID document can be computationally intensive. By storing the digests of previously authenticated ID documents, those ID documents may not be reprocessed with the above described method for authenticating an ID document. For example, a newly presented ID document can be quickly processed to generate a digest. The newly presented ID document can be authenticated by searching a digest table that contains the digests of previously authenticated ID documents. If the newly presented ID document's digest is found in the digest table, the ID document was previously authenticated and the previous result can be retuned. The system may only proceed to the computationally intensive method of comparing the ID document characteristics to priori data if the digest is not in the digest table.

Figure 9:
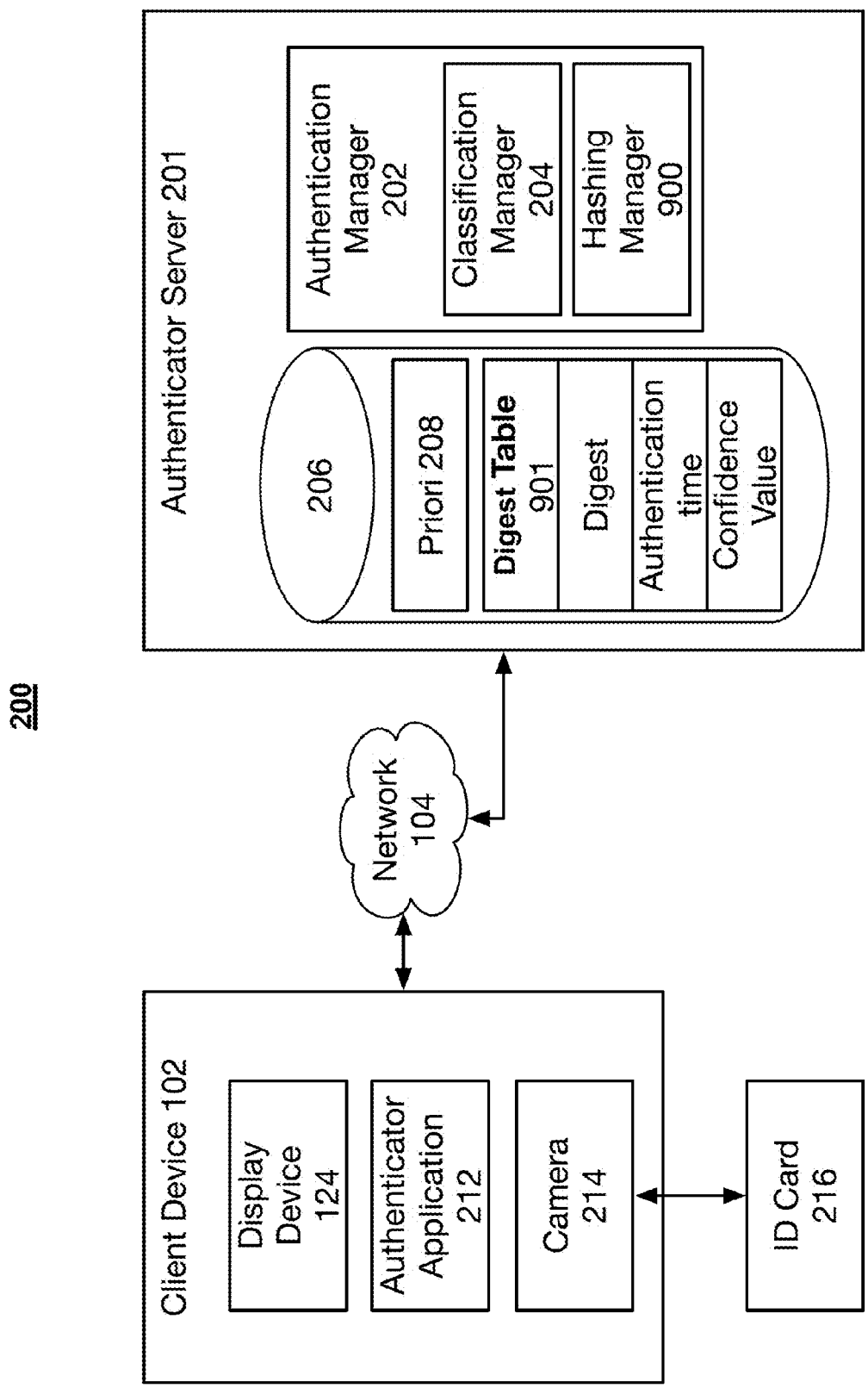
FIG. 9 illustrates a block diagram of another example system for authenticating identification documents in accordance with an implementation of the present disclosure.

FIG. 9 illustrates a block diagram of another example system 200 for authenticating identification documents. As described above in Section B, the system 200 can include a client device 102 that is in communication with an authentication server 201 via a network 104. The authentication server 201 executes, at least, one instance of an authentication manager 202. The authentication manager 202 includes a classification manager 204. The authenticator server 201 also includes a database 206 that stores a data structure of priori knowledge sets 208 that are used to analyze IDs 216. The system 200 can also include a hashing manager 900. The authenticator server 201 also includes a database 206 that stores a digest table 901. Each entry in the digest table 901 can include a digest, authentication time, and confidence value.

As described above, the authenticator server 201 and authenticator application 212 can process an image of an ID document and extract physical and other characteristics of the ID document. For example, the server can extract physical characteristics of one or more objects or patterns on a face of the ID document, such as a barcode. The authenticator server 201 can analyze the extracted physical characteristics and compare the extract characteristics against a database of characteristics extracted from known valid ID documents. The authenticator server 201, via the authentication manager 202, can also extract PII from the ID document. In some implementations, the PII on the ID document can be used to individually identify, contact, or locate a person. A non-exhaustive list of PII can include the name, address, social security number, identification number, banking information, date of birth, driver's license number, account number, financial information, transcript information, ethnicity, disciplinary or arrest records, health information, medical information, email addresses, phone numbers, web addresses, IP numbers, photographic data, or any combination thereof. For example, if the ID document is a driver's license, the PII contained on the driver's license and extracted by the authentication manager 202 can include a driver's license number, date of birth, sex, height, name, address, and full face photograph.

In some implementations, the authentication manager 202 includes an optical character recognition (OCR) component that scans the image captured of the ID document. The OCR component can use pattern recognition, artificial intelligence, or computer vision to extract text data from the captured image. Pattern recognition and pattern matching can then be used to classify the extracted text as a specific type of PII. For example, a regular expression can be generated for each of the different PII types. The regular expressions can then be applied to the extracted text to find matches between the extracted text and the PII types.

The hashing manager 900 is an application, program, library, script, service, processes, tasks, and any type and form of executable instructions executable by one or more processors of the authenticator server 201. The hashing manager 900 can encrypt the parsed PII by applying a cryptographic hash function to the PII. The cryptographic hash function can include secure hash algorithm (SHA) 1, SHA 2, SHA 3, message-digest (MD) 5, MD 6, or other hashing functions. The hashing manager's hash function processes the PII and generates a digest of the PII. The digest can be a 160-bit value that can, for example, render as a 40 digit long hexadecimal number. With each unique PII (or other data) provided to the hash function, the hash function generates a unique digest. For example, the extract PII—{"name":"John Smith", "dateofBirth":"1978-10-04", "idNumber":"3655-457"} may generate the digest—de9f2c7fd25e1b3afad3e85a0bd17d9b100db4b3. The time the digests are generated can be stored in the digest table 901 as the authentication time, and the degree of confidence that the ID document is real (based on the above-described methods) can be stored in the digest table 901 as the confidence value.

In some implementations, the hashing manager 900 generates two digests when processing the data from an ID document. The first digest can be used to identify the user or owner associated with the ID document and the second digest can be used to identify the ID document itself. For example, the PII extracted from the ID document can be processed to generate the first digest. The physical characteristics described above in Section B can be processed to generate the second digest. Generating a first digest to identify the owner associated with an ID document and a second digest to identify the ID document itself increases the reliability of the system when compared to processing all of the data into a single digest. For example, a first ID document (e.g., a driver's license) of a first user can be authenticated with the system 200. A time later, the first user presents a second ID document (e.g., a second driver's license) to the system 200 for authentication. During the intervening time, the user may have moved, which resulted in the user obtaining the second driver's license with his updated street address information. If the system 200 processed only the ID document characteristics (or both the ID document characteristics and PII information together) to generate a digest, the digest for the first driver's license and the second driver's license would be different. Because only digests are stored in the transaction log, the two digests would appear as the authentication of two different users. In this example, if the digest to identify the user includes only information unlikely to change, such as the user's name and date of birth, the digests from the first and second driver's licenses would return the same digest. The system 200 could then identify that the same user was authenticated twice rather than two separate users. In some implementations, the user PII can be split into a variety of different tiers based on features such as sex, eye color, height, weight, or detected facial features and then saved. Generating different tiers of digests that can correspond to different tiers of specificity can enable further analysis of the transaction logs. By splitting the process of user identification and document identification, the system 200 can reliably relay transaction histories regardless of geographic changes, determine any notable changes to the status of an identified user since their last submission, and safely improve the performance the system 200 by skipping authentication for repeat documents.

Once in digest form, the PII and other ID document data can be safely stored in the database 206 without risking that an unauthorized party could identify the owner of the ID document. Like the original PII, the digest can be used to identify ID documents and owners previously authenticated with the system 200. For example, rather than storing and comparing ID document owner PII, such as name and birthdate, transaction logs can include digests. Because unique PII generates the same, unique digest each time the unique PII is processed by the hashing manager 900, the unique digest can be used as a unique identifier to monitor transaction histories in the transaction logs.

In some implementations, storing the digest of the PII and ID document can increase the efficiency of the authentication process. For example, the first time that an ID document is authenticated, a digest of the ID document is generated and stored in the digest table 901. The confidence value that the ID document is authentic can be stored in association with the digest of the ID document. The next time the same ID document is processed to determine the authenticity of the document, a digest of the ID document can be generated. The authenticator server 201 can then search the digest table 901 to determine if the authenticator server 201 previously authenticated the ID document in question (e.g., is the digest already stored in the digest table 901). If the authenticator server 201 did previously authenticate the ID document, as identified only by the digest, the authenticator server 201 can return the previously determined confidence value that the ID document is authentic. If the authenticator server 201 does not find the digest in the digest table 901, then the authenticator server 201 can proceed with the authentication of the ID document as described above in Section B. This process can enable the authenticator server 201 to skip the computationally expensive process of authenticating ID documents that the authenticator server 201 previously authenticated.

Figure 10:
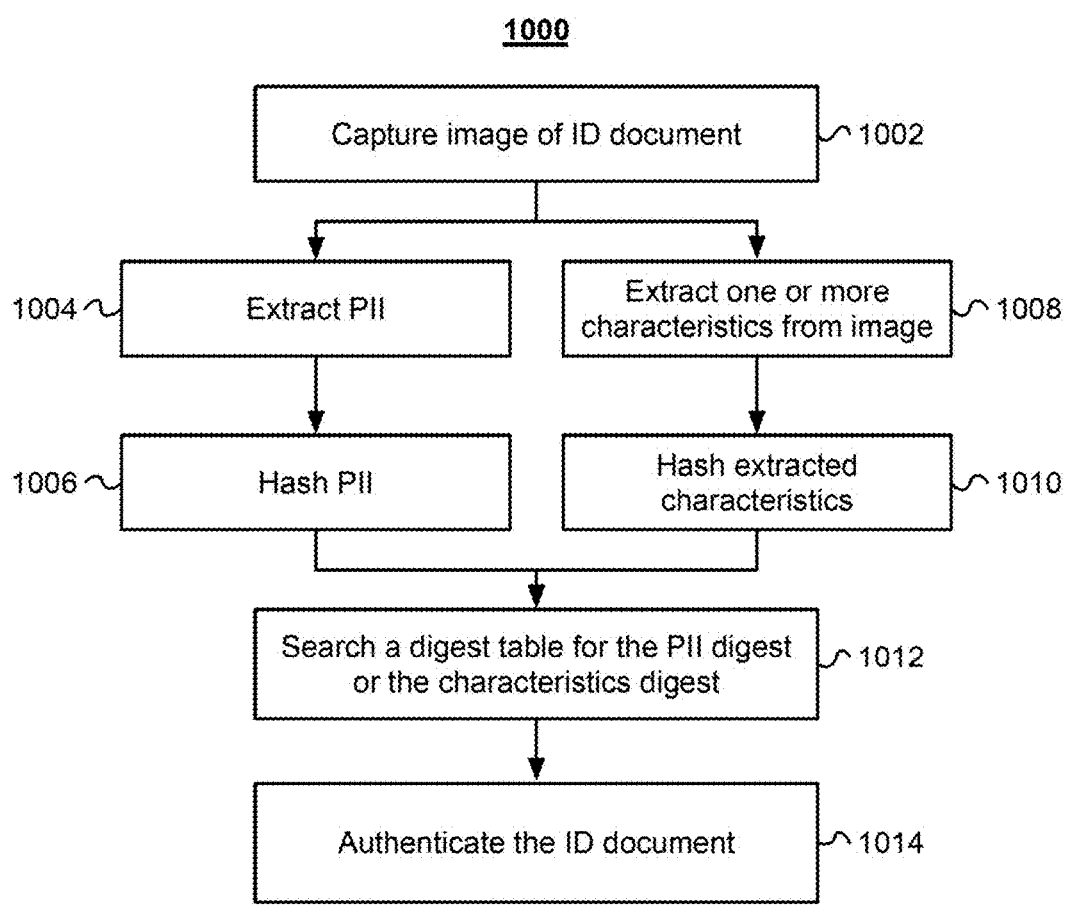
FIG. 10 illustrates a block diagram of a method for storing personally identifiable information in accordance with an implementation of the present disclosure.

FIG. 10 illustrates a block diagram of a method 1000 for storing PII. The method 1000 includes capturing an image of an ID document (BLOCK 1002). The method 1000 also includes extracting PII from the image (BLOCK 1004) and extracting physical characteristics from the image (BLOCK 1008). The extracted PII and extracted physical characteristics are processed with a hashing function (BLOCKS 1006 and 1010, respectively). The method 1000 can also include searching a digest table for the PII digest or the characteristics digest (BLOCK 1012). The method 1000 can also include authenticating the ID document (BLOCK 1014).

As set forth above, the method can include capturing an image of an ID document (BLOCK 1002). The image of the ID document can be captured by a client device. For example, the authenticator application discussed above (or a companion application) can be executed by a smartphone or tablet computer. The application can use the smartphone's built-in camera to capture an image of the ID document. For example, a smartphone can execute an instance of the authenticator application 212, which can present the user with a prompt to capture an image of the front and back of an ID document. The authenticator application 212 can also rotate, deskew, and otherwise correct the captured image to prepare the image for processing.

The ID document can include a first set of characteristics and a second set of characteristics. The first set of characteristics can any of the physical characteristics of the ID document described herein. For example, the physical characteristics can include the aspect ratio of barcode and barcode elements, number of groups, rows, columns, specific state security features, encryption markers, a size of the ID document, a location of a text block on the ID document, or a location, an aspect ratio, or a size of a barcode on the ID document. The second set of characteristics can identify a person that the ID document identifies. The second set of characteristics can include a name, an address, a social security number, an identification number, banking information, a date of birth, a driver's license number, an account number, financial information, transcript information, an ethnicity, arrest records, health information, medical information, email addresses, phone numbers, web addresses, IP numbers, or photographic data associate with the person.

The method 1000 can also include extracting PII from the captured image (BLOCK 1004). The PII can be any information contained or displayed on the ID document that is associated with the owner of the ID document. The PII can be any of the above described second set of characteristics. For example, if the ID document is a passport, the PII information can include name, date of birth, sex, and other information about the owner of the passport. The PII can be extracted from the image of the ID document by first processing the image with an OCR component to extract text from the image. Pattern matching can be used retrieve the desired PII form the extracted text.

The extracted PII can be classified into different identifiable information types. The identifiable information types can be the different fields of information included on the ID document. For example, the types can include an address field, date of birth field, ID number field, etc. The authentication manger can use pattern recognition, artificial intelligence, or computer vision to classify the extracted text as a specific type of PII. For example, a regular expression can be generated for each of the different PII types. In one example, the regular expression for the date of birth field would recognize and classify the extracted text of "05-24-1976" as a date of birth. The authentication manager could also include further logic to separate text between a date of birth field and an expiration date. For example, the authentication manager can determine that since the date is in the past (and beyond a predetermined threshold in the past), the above extracted test is a date of birth and not an expiration date.

The method can also include extracting one or more characteristics from the captured image (BLOCK 1008). In some implementations, the characteristics are extracted by the authenticator application executing on the client device. In other implementations, the client device can transmit the image to a remote server, e.g., the authenticator server, where the characteristics are extracted by an authentication manager. The extracted characteristics from the captured image can be any of the first set of characteristics described above or other physical characteristics described herein. In some implementations, the authentication manager can classify the captured ID document and determine to which class and sub-class the ID belongs. Based on the classification (into a class or sub-class), the authentication manager may select predetermined characteristics from the captured image to use in the set of characteristics for the ID document. For example, after classifying the ID document as a driver's license from Ohio, the authentication manager may reference a lookup table to determine which characteristics are most beneficial to use in determining the validity of an Ohio driver's license and then extract those characteristics form the image. Based on the classification, the authentication manager can select which physical characteristics to include in the first set of characteristics. Based on the classification, the authentication manager can select which PII information to include in the second set of characteristics.

In some implementations, the authentication manager can split the PII into a variety of different tiers based on features such as sex, eye color, height, weight, date of birth, or detected facial features. The information can be classified into different tiers based on the likelihood that the information will change. For example, date of birth, eye color, a height can be grouped into a first tier of information that is unlikely to change over time. The authentication manager can group information such as home address and hair color into a second tier of information that is more likely to change over time. By splitting the information into tiers, the authentication manager can be more reliable in authenticating previously authenticated users regardless of geographic and other changes that may occur normally during the ordinary course of a user's life.

The method 1000 also includes processing each of the extracted PII and the ID document characteristics with a hashing function (BLOCK 1006 and 1010). Also referring to FIG. 9, the hashing manager 900 of the authenticator server 201 can perform the hashing function to generate a separate digest for both the PII and the ID document characteristics. For example, the ID document characteristics, including the first set of characteristics, can be hashed to generate a first digest, and the PII, including the second set of characteristics, can be hashed to generate a second digest. In some implementations, the hashing manager 900 can apply the same hashing function to the PII and the ID document characteristics, and in other implementations, the hashing manager 900 can apply different hashing functions to the PII and the ID document characteristics. For example, the PII can be hashed with a more secure, but more computationally intensive hashing function than compared to the ID document characteristics. When the characteristics are split into different tiers, the hashing manager can perform a hashing function on the characteristics in each of the tiers to generate a different digest for each tier.

The method 1000 can also include searching a digest table for the PII digest or the characteristics digest (BLOCK 1012). In some implementations, the system previously authenticated one or more ID documents and stored the digests from those ID documents in the digest table. The digests can act as a key in for the digest table with the time the ID document was authenticated and the confidence value that the ID document is authentic stored as the values associated with the key. As discussed above, the confidence value can be generated during a previous authentication of the ID document. The key and values form a key-value pair that is stored in the digest table. During the method 1000, the PII digest and the characteristics digest can be used as keys to search the digest table for a match. If a match is found, it means or identifies that the ID document or the owner of the ID document was previously authenticated.

The method 1000 can also include authenticating the ID document (BLOCK 1014). Using the digests as keys, the system can retrieve the values associated with the digest. As described above, the values can include the time the ID document was last authenticated and the confidence value that the ID document is authentic. If a match is found in the digest table—meaning the ID document was previously authenticated—the system can retrieve the confidence value associated with the digest and compare the confidence value to a predetermined threshold. If the confidence value is above the predetermined threshold, then the system transmits a message to the client device of the system that the ID document is authentic. Similarly, if the confidence value is below the predetermined threshold, the system can transmit a message to the client device of the system that the ID document is not authentic. If the digest is in the digest table, the present time can be added to the digest's entry in the digest table to indicate that the ID document was authenticated again.

If the search of the digest table reveals that the PII digest or the ID document characteristic digest were not previously stored in the digest table, the system can use the one or more characteristics from the image extracted at BLOCK 1008 to authenticate the ID document. For example, the system can authenticate the ID document using the method 700 described above in relation to FIG. 7. Responsive to completing the method 700, the results (e.g., the confidence value that the ID document is authentic and a time stamp of when the authentication was completed) can be stored in the digest table in association with the PII digest and the characteristic digest generated at BLOCK 1006 and BLOCK 1010.

Conclusion

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for securely determining a physical identification document is authentic using personally identifiable information of the physical identification document, the method comprising:
   (a) receiving, by an authentication manager, an image of a first physical identification document to be authenticated, the first physical identification document comprising a first set of characteristics identifying a class of the first physical identification document and a second set of characteristics identifying a person that the first physical identification document identifies;
   (b) extracting the first set of characteristics and the second set of characteristics of the first physical identification document;
   (c) applying a hash function on the first set of characteristics to generate a first digest and on the second set of characteristics to generate a second digest;
   (d) determining, via a digest table of previously authenticated physical identification documents using at least one of the first digest or the second digest, that the first physical identification document was previously authenticated; and
   (e) providing an indication that the first physical identification document is authenticated based at least on a confidence value from the digest table corresponding to the first physical identification document being greater than a predetermined threshold.

2. The method of claim 1, wherein (a) further comprises one of scanning or capturing, by an application on a client device, the image of the first physical identification document and transmitting the image to the authentication manager.

3. The method of claim 1, wherein (b) further comprises performing optical character recognition on the second set of characteristics to identify personally identifiable information of the person from the first physical identification document.

4. The method of claim 1, wherein (b) further comprises classifying, using the first set of characteristics, the first physical identification document into a sub-class.

5. The method of claim 4, further comprising selecting, by the authentication manager, the second set of characteristics identifying the person based on the class of the first physical identification document.

6. The method of claim 1, wherein (b) further comprises extracting the first set of characteristics comprising one or more of a size of the first physical identification document, a location of a text block on the first physical identification document, or a location, an aspect ratio, or a size of a barcode on the first physical identification document.

7. The method of claim 1, wherein (b) further comprises extracting the second set of characteristics comprising one or more of a name, an address, a social security number, an identification number, banking information, a date of birth, a driver's license number, an account number, financial information, transcript information, an ethnicity, arrest records, health information, medical information, email addresses, phone numbers, web addresses, IP numbers, or photographic data associated with the person.

8. The method of claim 1, further comprising classifying the second set of characteristics into one of a plurality of identifiable information types.

9. The method of claim 1, wherein (c) further comprises:
   splitting the second set of characteristics into a plurality of tiers, each of the plurality of tiers associated with a different feature of the second set of characteristics; and
   applying the hash function to each of the plurality of tiers to generate a separate digest for each of the plurality of tiers.

10. The method of claim 1, further comprising:
    determining, via a digest table of previously authenticated persons using the second digest, that the person was previously authenticated; and
    providing a second indication that the person is authenticated based at least on a second confidence value from the digest table of previously authenticated persons being greater than a second predetermined threshold.

11. A system for securely determining a physical identification document is authentic using personally identifiable information of the physical identification document comprises a processor and a memory device, the processor executing an authentication manager, the authentication manager configured to:

receive an image of a first physical identification document to be authenticated, the first physical identification document comprising a first set of characteristics identifying a class of the first physical identification document and a second set of characteristics identifying a person that the first physical identification document identifies;

extract the first set of characteristics and the second set of characteristics of the first physical identification document;

apply a hash function on the first set of characteristics to generate a first digest and on the second set of characteristics to generate a second digest;

determine, via a digest table of previously authenticated physical identification documents using at least one of the first digest or the second digest, that the first physical identification document was previously authenticated; and provide an indication that the first physical identification document is authenticated based at least on a confidence value from the digest table corresponding to the first physical identification document being greater than a predetermined threshold.

12. The system of claim 11, wherein the authentication manager is configured to receive the image of the first physical identification document from a client device, the image scanned or captured by an application on the client device.

13. The system of claim 11, wherein the authentication manager is configured to perform optical character recognition on the second set of characteristics to identify personally identifiable information of the person from the first physical identification document.

14. The system of claim 11 wherein the authentication manager is configured to classify, using the first set of characteristics, the first physical identification document into a sub-class.

15. The system of claim 14, wherein the authentication manager is configured to further select the second set of characteristics identifying the person based on the class of the first physical identification document.

16. The system of claim 11, wherein the authentication manager is configured to extract the first set of characteristics comprising one or more of a size of the first physical identification document, a location of a text block on the first physical identification document, or a location, an aspect ratio, or a size of a barcode on the first physical identification document.

17. The system of claim 11, wherein the authentication manager is configured to extract the second set of characteristics comprising one or more of a name, an address, a social security number, an identification number, banking information, a date of birth, a driver's license number, an accountnumber, financial information, transcript information, an ethnicity, arrest records, health information, medical information, email addresses, phone numbers, web addresses, IP numbers, or photographic data associated with the person.

18. The system of claim 11, wherein the authentication manager is configured to classify the second set of characteristics into one of a plurality of identifiable information types.

19. The system of claim 11, wherein the authentication manager is configured to:

split the second set of characteristics into a plurality of tiers, each of the plurality of tiers associated with a different feature of the second set of characteristics; and apply the hash function to each of the plurality of tiers to generate a separate digest for each of the plurality of tiers.

20. The system of claim 11, wherein the authentication manager is configured to:

determine, via a digest table of previously authenticated persons using the second digest, that the person was previously authenticated; and provide a second indication that the person is authenticated based at least on a second confidence value from the digest table of previously authenticated persons being greater than a second predetermined threshold.

* * * * *

UNITED STATES PATENT AND TRADEMARK OFFICE
CERTIFICATE OF CORRECTION

PATENT NO. : 10,210,386 B2
APPLICATION NO. : 15/475878
DATED : February 19, 2019
INVENTOR(S) : Rodriguez Page 1 of 1

It is certified that error appears in the above-identified patent and that said Letters Patent is hereby corrected as shown below:

In the Claims

Claim 11, Column 27, Lines 1-2, please delete "document comprises a" and insert --document, the system comprising a--;

Claim 17, Column 28, Line 15, please delete "accountnumber" and insert --account number--.

Signed and Sealed this
Thirtieth Day of April, 2019

Andrei Iancu
*Director of the United States Patent and Trademark Office*